US008905572B2

(12) United States Patent
Mueckl et al.

(10) Patent No.: US 8,905,572 B2
(45) Date of Patent: Dec. 9, 2014

(54) PORTABLE LIGHT, SUCH AS A STICK LIGHT

(71) Applicant: Milwaukee Electric Tool Corporation, Brookfield, WI (US)

(72) Inventors: Gareth Mueckl, Milwaukee, WI (US); Timothy Janda, Stevensville, MI (US); Wade F. Burch, Wauwatosa, WI (US); Kyle Harvey, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 13/837,151

(22) Filed: Mar. 15, 2013

(65) Prior Publication Data

US 2013/0258649 A1 Oct. 3, 2013

Related U.S. Application Data

(60) Provisional application No. 61/616,811, filed on Mar. 28, 2012, provisional application No. 61/724,085, filed on Nov. 8, 2012.

(51) Int. Cl.

| | |
|---|---|
| ***F21L 4/00*** | (2006.01) |
| ***H04M 1/22*** | (2006.01) |
| ***F21V 21/06*** | (2006.01) |
| ***F21V 17/12*** | (2006.01) |
| ***F21V 15/01*** | (2006.01) |
| *F21V 21/08* | (2006.01) |
| *F21Y 103/00* | (2006.01) |
| *F21Y 101/02* | (2006.01) |

(52) U.S. Cl.

CPC ............. *F21V 15/01* (2013.01); *F21V 21/0816* (2013.01); *F21V 21/08* (2013.01); *F21Y 2103/003* (2013.01); *F21V 21/06* (2013.01); *F21Y 2101/02* (2013.01); *F21L 4/00* (2013.01); *F21V 17/12* (2013.01)

USPC ........... 362/191; 362/186; 362/183; 362/260; 362/398

(58) Field of Classification Search

CPC ... F21V 21/08; F21V 21/0885; F21V 21/145; F21V 21/0965; F21V 21/406; F21L 14/02; F21L 14/026

USPC .......................... 362/191, 186, 183, 260, 398

See application file for complete search history.

(56) References Cited

U.S. PATENT DOCUMENTS

| | | | | | |
|---|---|---|---|---|---|
| 1,722,773 | A | * | 7/1929 | Stewart .................... | 248/229.16 |
| 2,889,450 | A | | 6/1959 | Nordquist et al. | |
| 3,103,659 | A | | 9/1963 | Edwards | |
| 3,828,181 | A | * | 8/1974 | Goodwin ...................... | 362/269 |
| 4,019,047 | A | * | 4/1977 | Frey .............................. | 362/257 |
| 4,128,226 | A | * | 12/1978 | Ross et al. .................... | 362/378 |
| 4,246,629 | A | | 1/1981 | Marrero | |
| 5,043,851 | A | | 8/1991 | Kaplan | |

(Continued)

*Primary Examiner* — Thomas A Hollweg

(74) *Attorney, Agent, or Firm* — Michael Best & Friedrich LLP

(57) ABSTRACT

A portable light includes an elongated housing having a longitudinal axis, a light source positioned within the elongated housing, and an attachment member movably coupled to the elongated housing to hang the portable light from a support structure. The attachment member is movable to a first position, in which the attachment member generally extends from the elongated housing in a direction parallel to the longitudinal axis, and to a second position, in which the attachment member generally extends from the elongated housing in a direction perpendicular to the longitudinal axis.

33 Claims, 11 Drawing Sheets

(56) References Cited

U.S. PATENT DOCUMENTS

| | | | | | |
|---|---|---|---|---|---|
| D335,756 | S | | 5/1993 | Gaynor | |
| 5,217,300 | A | * | 6/1993 | Lwery | 362/387 |
| 5,339,229 | A | | 8/1994 | Snyder | |
| 5,465,196 | A | * | 11/1995 | Hasenberg et al. | 362/183 |
| 5,528,477 | A | * | 6/1996 | Carmo | 362/260 |
| 5,568,968 | A | * | 10/1996 | Jaramillo | 362/376 |
| D389,931 | S | | 1/1998 | Kovacik et al. | |
| D409,776 | S | * | 5/1999 | Ghode et al. | D26/42 |
| 5,988,828 | A | * | 11/1999 | Prince et al. | 362/191 |
| D418,238 | S | * | 12/1999 | Offiler | D26/42 |
| 6,070,295 | A | | 6/2000 | Hulsebus | |
| D438,656 | S | | 3/2001 | Lupica | |
| D458,400 | S | | 6/2002 | Kovacik et al. | |
| 6,497,496 | B2 | | 12/2002 | Wang | |
| 6,536,912 | B2 | | 3/2003 | Parker | |
| 6,722,774 | B2 | * | 4/2004 | Kovacik et al. | 362/396 |
| 6,749,318 | B1 | | 6/2004 | Palacios | |
| 6,799,863 | B2 | * | 10/2004 | Offiler et al. | 362/220 |
| D501,687 | S | | 2/2005 | Kovacik et al. | |
| D501,688 | S | | 2/2005 | Kovacik et al. | |
| 6,857,756 | B2 | | 2/2005 | Reiff et al. | |
| 6,976,771 | B1 | | 12/2005 | Galvez | |
| D515,721 | S | | 2/2006 | Lin | |
| D519,659 | S | | 4/2006 | Yuen | |
| 7,059,743 | B2 | * | 6/2006 | Niemann | 362/184 |
| 7,090,381 | B2 | * | 8/2006 | Kovacik et al. | 362/374 |
| D529,210 | S | | 9/2006 | Mundhra | |
| 7,153,004 | B2 | | 12/2006 | Galli | |
| D538,457 | S | | 3/2007 | Kovacik et al. | |
| D545,469 | S | | 6/2007 | Wikle et al. | |
| 7,246,927 | B2 | | 7/2007 | Wikle et al. | |
| 7,290,904 | B2 | | 11/2007 | Miller | |
| D556,926 | S | | 12/2007 | Thirouin | |
| 7,306,052 | B2 | * | 12/2007 | Vahabi-Nejad et al. | 173/217 |
| 7,338,189 | B2 | * | 3/2008 | Kovacik et al. | 362/398 |
| 7,370,989 | B2 | * | 5/2008 | Bayat et al. | 362/186 |
| 7,401,941 | B2 | * | 7/2008 | Teng et al. | 362/197 |
| D592,784 | S | | 5/2009 | van den Dool | |
| 7,527,392 | B2 | * | 5/2009 | Kovacik et al. | 362/260 |
| D593,695 | S | | 6/2009 | Levine | |
| D596,326 | S | | 7/2009 | Jiang | |
| 7,682,033 | B2 | | 3/2010 | Cranor | |
| 7,703,966 | B2 | | 4/2010 | Waters | |
| 7,705,542 | B2 | | 4/2010 | Hilt et al. | |
| D626,673 | S | | 11/2010 | Kovacik et al. | |
| 7,866,840 | B2 | | 1/2011 | Padden | |
| D641,925 | S | * | 7/2011 | Ko | D26/138 |
| D647,653 | S | | 10/2011 | Leen | |
| 8,148,917 | B2 | | 4/2012 | Hilt et al. | |
| D661,417 | S | | 6/2012 | Kung | |
| D664,289 | S | * | 7/2012 | Ko | D26/138 |
| D684,283 | S | | 6/2013 | Zhou et al. | |
| 8,506,111 | B2 | * | 8/2013 | Woods | 362/191 |
| D691,310 | S | | 10/2013 | Zhou et al. | |
| D694,446 | S | | 11/2013 | Zhou et al. | |
| 8,628,228 | B2 | * | 1/2014 | Lundy | 362/555 |
| 8,777,446 | B2 | * | 7/2014 | Sharrah et al. | 362/199 |
| 2002/0149930 | A1 | | 10/2002 | Parker | |
| 2004/0085761 | A1 | * | 5/2004 | Offiler et al. | 362/217 |
| 2005/0063179 | A1 | * | 3/2005 | Niemann | 362/184 |
| 2005/0083684 | A1 | * | 4/2005 | Kovacik et al. | 362/217 |
| 2005/0259412 | A1 | | 11/2005 | Hiromori | |
| 2006/0070761 | A1 | * | 4/2006 | Vahabi-Nejad et al. | 173/217 |
| 2006/0120090 | A1 | | 6/2006 | Wikle et al. | |
| 2006/0221615 | A1 | * | 10/2006 | Bayat et al. | 362/260 |
| 2008/0212319 | A1 | * | 9/2008 | Klipstein | 362/231 |
| 2009/0196054 | A1 | | 8/2009 | Cheng | |
| 2010/0020543 | A1 | | 1/2010 | Yiu et al. | |
| 2010/0085739 | A1 | | 4/2010 | Webb et al. | |
| 2011/0222274 | A1 | * | 9/2011 | Ko et al. | 362/191 |
| 2012/0033415 | A1 | * | 2/2012 | Sharrah et al. | 362/199 |
| 2012/0275142 | A1 | * | 11/2012 | Lundy | 362/184 |

* cited by examiner

PORTABLE LIGHT, SUCH AS A STICK LIGHT

CROSS-REFERENCE TO RELATED APPLICATIONS

This application claims priority to U.S. Provisional Patent Application No. 61/616,811, filed Mar. 28, 2012, and to U.S. Provisional Patent Application No. 61/724,085, filed Nov. 8, 2012, the entire contents of both of which are incorporated by reference herein.

BACKGROUND

The present invention relates to portable lights. More specifically, the invention relates to an LED-based stick light or trouble light that is powered by a DC power source.

Stick lights or trouble lights are commonly used to illuminate work areas that are otherwise difficult to light. Examples of these areas include engine compartments, ceiling spaces, basement areas, and the like. The lights are typically positioned such that they shine light in the desired area without being held by a user.

SUMMARY

In one embodiment, the invention provides a portable light including an elongated housing having a longitudinal axis, a light source positioned within the elongated housing, and an attachment member movably coupled to the elongated housing to hang the portable light from a support structure. The attachment member is movable to a first position, in which the attachment member generally extends from the elongated housing in a direction parallel to the longitudinal axis, and to a second position, in which the attachment member generally extends from the elongated housing in a direction perpendicular to the longitudinal axis.

In another embodiment, the invention provides a portable light including an elongated housing having a first end, a second end, a first side extending between the first and second ends, and a second side extending between the first and second ends. The second side defines a slot. The portable light also includes a light source positioned within the elongated housing. The light source is visible through the first side of the elongated housing. The portable light further includes an attachment member coupled to the elongated housing to hang the portable light from a support structure. The attachment member is partially received within the slot such that the attachment member is movable relative to the elongated housing.

In yet another embodiment, the invention provides a portable light including an elongated housing having a first end, a second end, and an opening formed in a side of the elongated housing between the first and second ends. The portable light also includes a light source positioned within the opening of the elongated housing and an actuator positioned within the opening of the elongated housing and electrically coupled to the light source. The actuator is operable to control operation of the light source. The portable light further includes a faceplate removably coupled to the elongated housing over the opening. The faceplate includes a lens that covers the light source and a movable member that covers the actuator.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out various ways.

Figure 1:
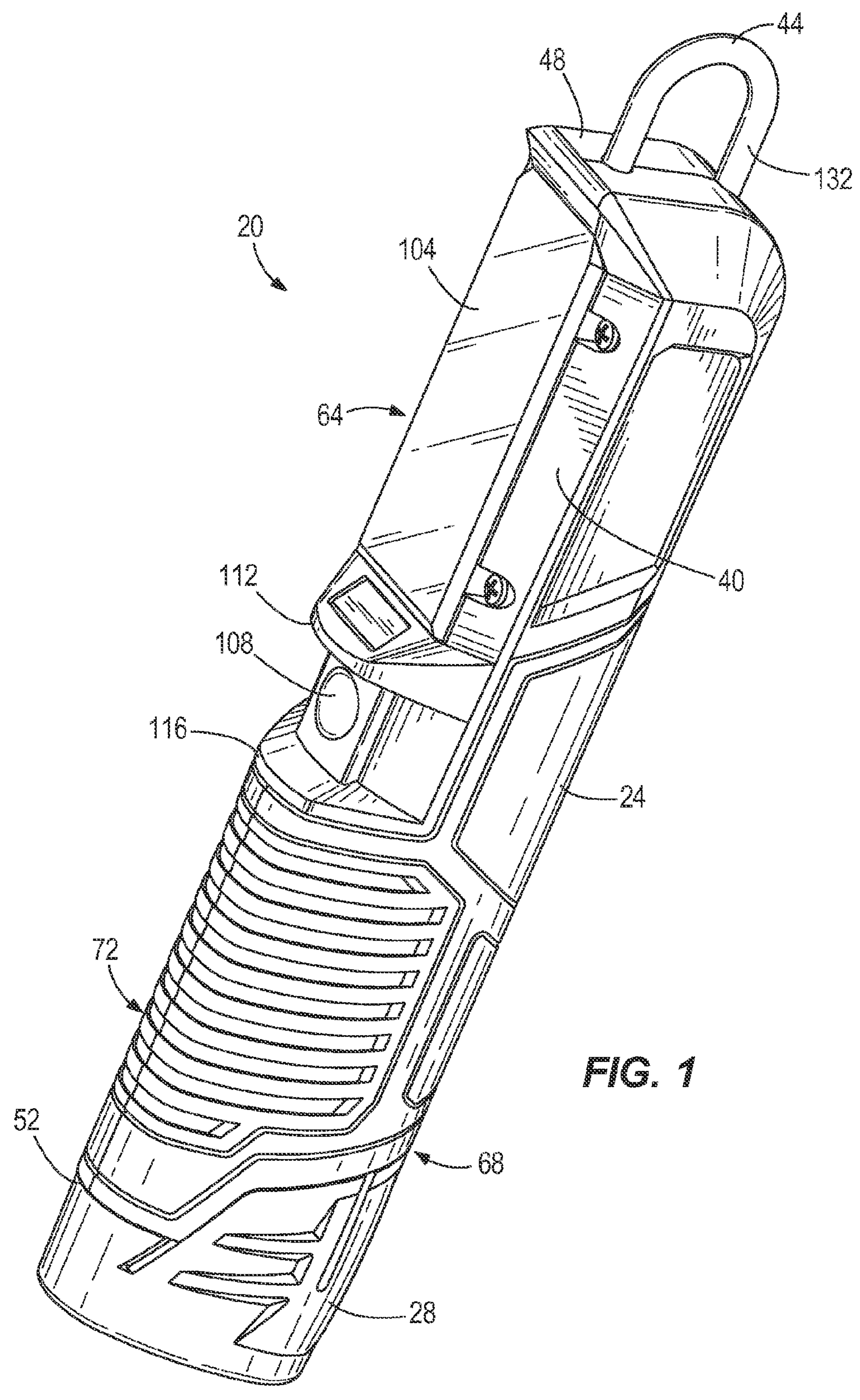
FIG. 1 is a perspective view of a stick light embodying the invention.
Figure 2:
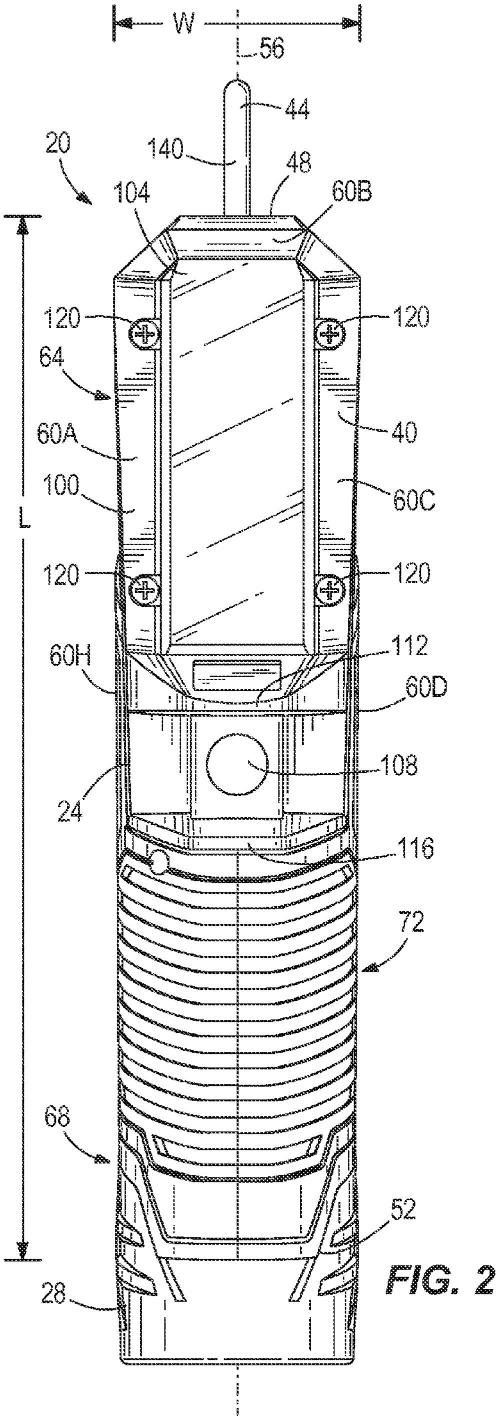
FIG. 2 is a front view of the stick light of FIG. 1.
Figure 3:
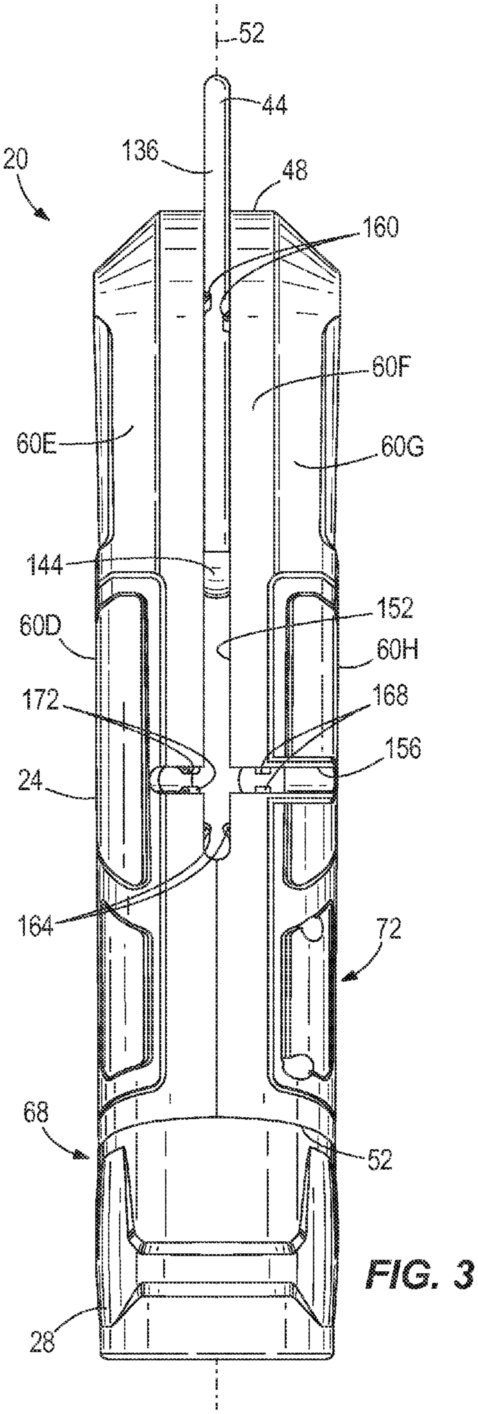
FIG. 3 is a rear view of the stick light of FIG. 1.

FIGS. 1-3 illustrate a portable light 20, such as a stick light or trouble light. The illustrated stick light 20 is a hand-held, electrically powered light that includes an elongated housing 24, a battery pack 28, a light source 32 (FIG. 4), an actuator 36 (FIG. 4), a removable faceplate 40, and an attachment member 44. In operation, the battery pack 28 selectively provides power to the light source 32 to illuminate an area with the light source 32. In addition, the attachment member 44 extends from the housing 24 such that a user can hang or suspend the stick light 20 from a support structure without holding the light 20.

The illustrated housing 24 is elongated in that an overall length L (FIG. 2), or height, of the housing 24 is significantly greater than a width W (FIG. 2), or diameter, of the housing 24, giving the light 20 a stick or tube-shaped appearance. As shown in FIGS. 1-3, the elongated housing 24 includes a first end 48, a second end 52, and a longitudinal axis 56 extending through the first and second ends 48, 52. The elongated housing also includes sides 60A-H (FIGS. 2 and 3) that extend between the first and second ends 48, 52. The sides 60A-H define a light-emitting portion 64, a battery support portion 68, and a grip portion 72 of the stick light 20.

The light-emitting portion 64 is adjacent the first end 48 of the elongated housing 24 and houses the light source 32. The light-emitting portion 64 includes an opening 76 (FIG. 4) that is formed in three of the sides 60A-C of the housing 24 and that is covered by the faceplate 40. The light source 32 is oriented within the opening 76 to emit light outward through the faceplate 40 in a direction generally perpendicular to the longitudinal axis 56. As such, the light source 32 is visible through at least one of the sides 60A-C (as opposed to one of the ends 48, 52) of the elongated housing 24.

The battery support portion 68 is adjacent the second end 52 of the elongated housing 24. In the illustrated embodiment, the battery support portion 68 includes a recess formed in the second end 52 of the housing 24. The recess is adapted to receive a portion of the battery pack 28. In other embodiments, the battery support portion 68 may include guide rails to support a slide-on-style battery pack. The illustrated battery pack 28 is a 12 volt power tool battery pack, such as the M12 Battery Pack sold by Milwaukee Electric Tool Corporation. The battery pack 28 includes a plurality of lithium-ion cells to power the light source. In other embodiments, the battery pack 28 may have different voltages and/or chemistries. As shown in FIGS. 1-3, an outer surface of the housing 24 and an outer surface of the battery pack 28 are similarly shaped and contoured such that the battery pack 28 forms an extension of the grip portion 72 when connected to the elongated housing 24.

The grip portion 72 is located between the light-emitting portion 64 and the battery support portion 68. The grip portion 72 is configured to be grasped by a user to hold and carry the stick light 20. In some embodiments, such as the illustrated embodiment, a relatively soft material may be positioned or molded over at least a portion of the grip portion 72 to further enhance the gripability of the housing 24.

Figure 4:
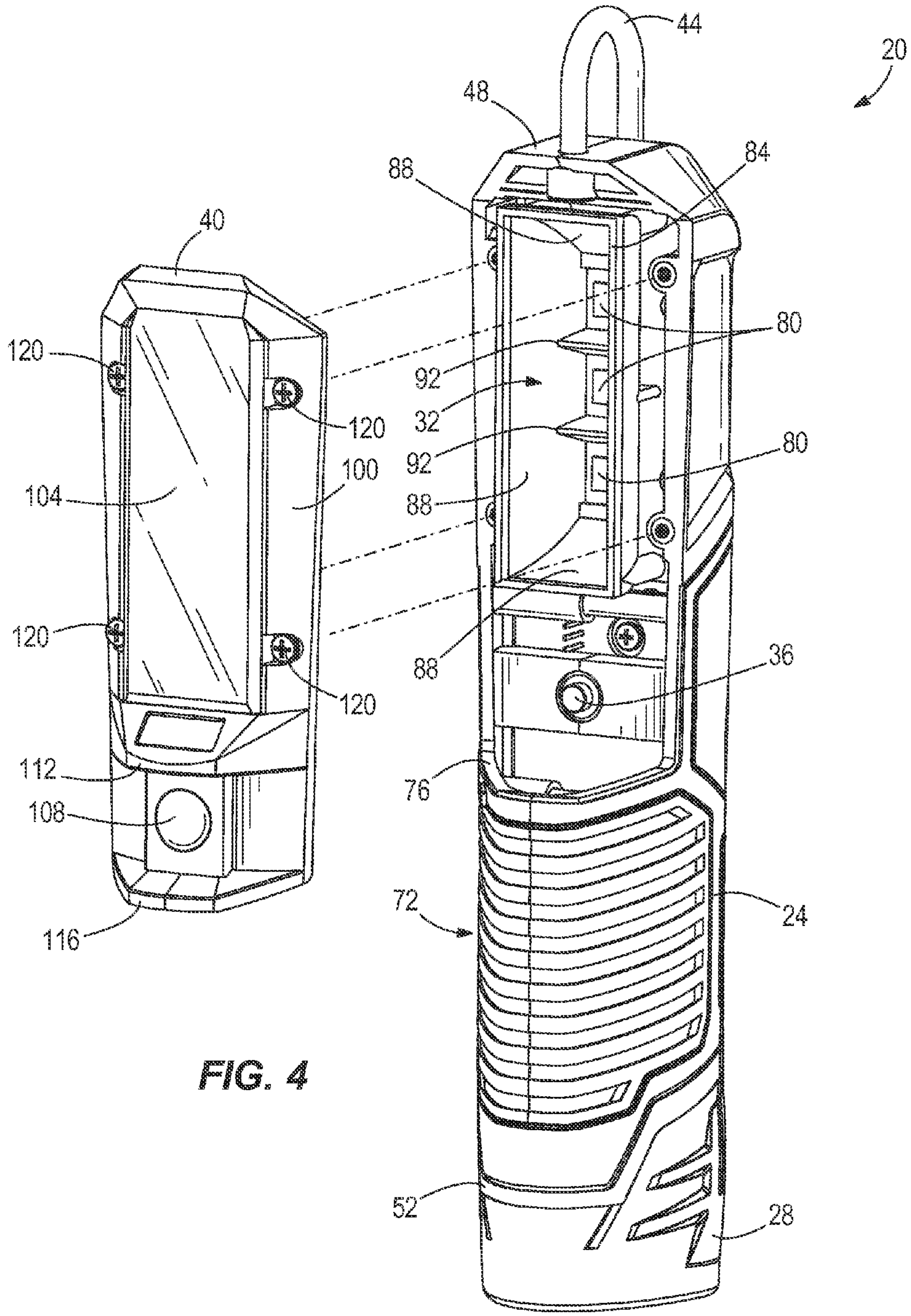
FIG. 4 is an exploded perspective view of the stick light of FIG. 1.
Figure 5:
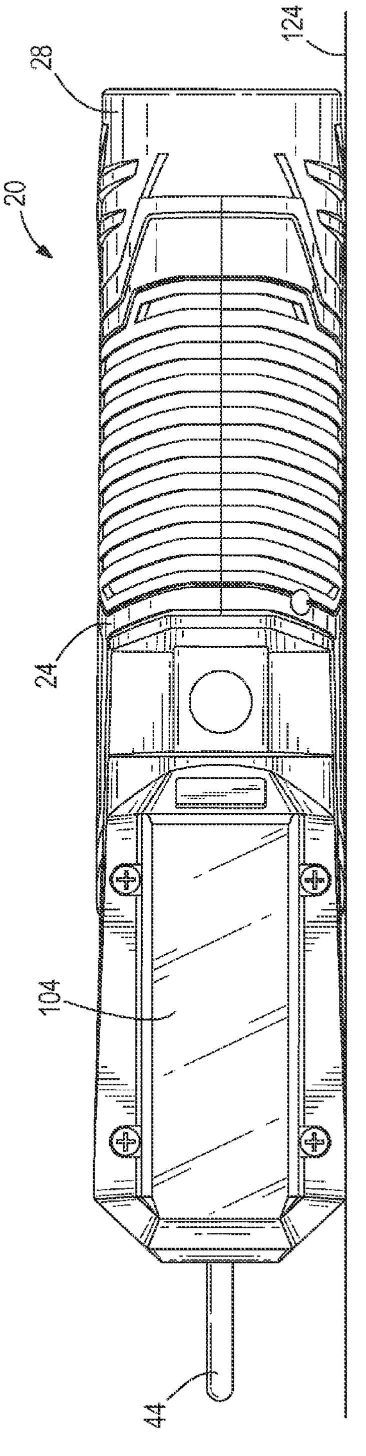
FIG. 5 is a front view of the stick light of FIG. 1 positioned on a flat surface.

As shown in FIG. 4, the light source 32 is positioned within the opening 76 formed in the sides 60A-C of the elongated housing 24. In the illustrated embodiment, the light source 32 includes three light emitting diodes 80 (LEDs) arranged in a line that is parallel to the longitudinal axis 56. In other embodiments, the light source 32 may include fewer or more LEDs 80 arranged in other patterns or arrays. For example, in some embodiments, the LEDs 80 may be arranged in a grid or in a line that is perpendicular to the longitudinal axis 56. The number and positioning of the LEDs 80 may vary depending on the light requirements for a particular application.

Figure 18:
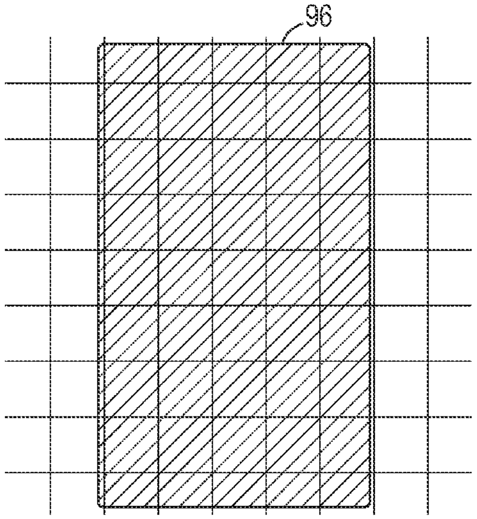
FIG. 18 is a plan view of a grid pattern illuminated by the stick light of FIG. 1.

The light source 32 also includes a reflector 84 positioned within the opening 76 of the elongated housing 24 around the LEDs 80. The reflector 84 helps distribute and intensify the light being emitted from the LEDs 80. The reflector 84 includes four sloped outer walls 88 that extend from edges of the opening 76 toward the LEDs 80 and two bridges 92 that extend between adjacent LEDs 80. The illustrated reflector 84 is composed of metal, but may alternatively be composed of other suitable materials. The outer walls 88 and the bridges 92 are metallized with a bumpy finish rather than a mirror finish as one might expect. This bumpy finish helps diffuse the emitted light to assist in the reduction of "hot spots." As such, the reflector 84 is designed to help the LEDs 80 emit a generally uniform, rectangular illumination pattern 96, as shown in FIG. 18. The reflector 84 also improves the total quality of light being emitted from the stick light 20.

Referring back to FIG. 4, the actuator 36 is also positioned within the opening 76 formed in the sides 60A-C of the elongated housing 24. The actuator 36 is electrically coupled to the battery pack 28 and the light source 32 through a controller and/or circuit within the housing 24 to control operation of the stick light 20. The illustrated actuator 36 is located generally in the middle of the elongated housing 24 between the light source 32 and the second end 52 of the elongated housing 24. The actuator 36 is also positioned on the same side 60B of the housing 24 as the light source 32. In addition, the actuator 36 is positioned adjacent the grip portion 72 such that a user holding the stick light 20 at the grip portion 72 can easily operate the light with a single hand.

In the illustrated embodiment, the actuator 36 is a button that may be depressed by a user to turn the stick light 20 (particularly the light source 32) on and off. In other embodiments, other suitable actuators may also or alternatively be employed. In some embodiments, the light source 32 may be configured to emit different intensities of light. In such embodiments, actuating the actuator 36 multiple times may change the intensity of the light being emitted (e.g., from a low intensity setting to a high intensity setting, or vice versa). Additionally, the stick light 20 may include an indicator, such as a meter, positioned on the housing 24 to indicate to a user the current intensity level or setting of the stick light 20.

The faceplate 40 is removably coupled to the elongated housing 24 at the light-emitting portion 64. The faceplate 40 is positioned over the opening 76 in the sides 60A-C of the housing 24 to enclose the opening 76 and help define the light-emitting portion 64. When coupled to the elongated housing 24, the faceplate 40 also forms portions of the sides 60A-C of the housing 24. The illustrated faceplate 40 includes a frame 100, a lens 104, and a movable member 108. The frame 100 supports the lens 104 and the movable member 108 such that the faceplate 40 is removable from the elongated housing 24 as a single unit, as shown in FIG. 4. The frame 100 also generally matches the shape and contour of the elongated housing 24, giving the stick light 20 a continuous outer surface.

The lens 104 covers the light source 32 to protect the LEDs 80, and other internal components, from damage. The lens 104 also helps redirect light being emitted by the LEDs 80. The illustrated lens 104 is made of a clear plastic material to direct light from the LEDs 80 out of the elongated housing 24. In some embodiments, that lens 104 may be a diffuse lens that better spreads out light emitted by the LEDs 80 to reduce the likelihood of hot spots or bright spots created by the light source 32. The shape and thickness of the lens 104 can also be controlled to further enhance the pattern of light being emitted by the LEDs 80.

The movable member 108 covers the actuator 36 to protect the actuator 36. The illustrated movable member 108, or switch cover, is an elastomeric membrane that can be depressed by a user to actuate the actuator 36 through the faceplate 40. The movable member 108 may be formed of a corrosion resistant material (e.g., rubber) to seal the actuator 36 within the housing 24. As shown in FIG. 1, the movable member 108 is located adjacent an end of the faceplate 40 that is near the grip portion 72. The movable member 108 is recessed between two extended flanges 112, 116 of the faceplate 40 to inhibit unintentional actuation of the member 108, and thereby the actuator 36.

As shown in FIG. 4, the faceplate 40 is removably coupled to the housing 24 by four threaded fasteners 120 (e.g., screws). The fasteners 120 extend through openings in the frame 100 and engage the elongated housing 24 to secure the faceplate 40 to the housing 24. The fasteners 120 allow the faceplate 40 to be removed from the housing 24 to service the internal components (e.g., the light source 32 and the actuator 36) of the stick light 20. In addition, the faceplate 40 can be easily replaced if the lens 104 and/or the movable member 108 become overly dirty or worn. Such replaceability helps extend the overall life of the stick light 20. In other embodiments, the faceplate 40 may be removably coupled to the housing 24 using other suitable fasteners, such as clips, snaps, frictional engagements, adhesives, and the like.

Figure 8:
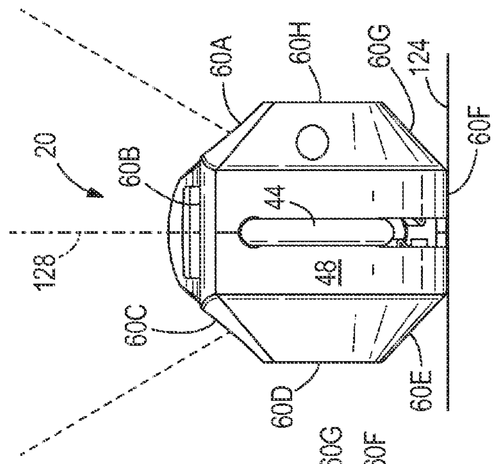
FIG. 8 is an end view of the stick light of FIG. 1 positioned on the flat surface to project light in a third direction.
Figure 7:
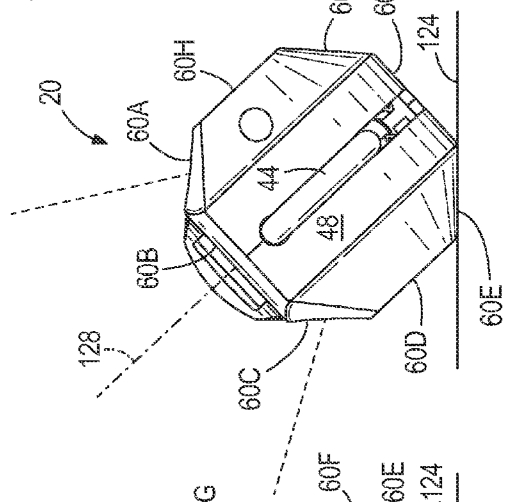
FIG. 7 is an end view of the stick light of FIG. 1 positioned on the flat surface to project light in a second direction.
Figure 6:
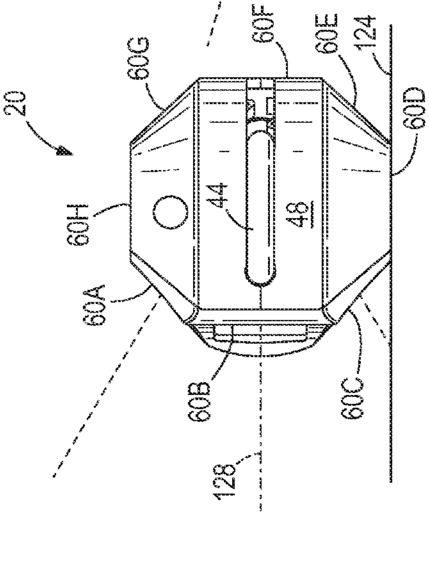
FIG. 6 is an end view of the stick light of FIG. 1 positioned on the flat surface to project light in a first direction.

As shown in FIGS. 5-8, the elongated housing 24 of the stick light 20 is generally octagonal. The housing (with the faceplate 40 attached) includes eight generally planar sides 60A-H, or facets, that are angled at about 135 degrees relative to each other to define the octagonal shape of the stick light 20. The sides 60A-H are considered to be "generally planar" in that, when viewed from the first end 48 of the housing 24 (as shown in FIGS. 6-8), the sides 60A-H are sufficiently flat such that the stick light 20 can rest on each side 60A-H without freely rolling. In addition, the sides 60A-H are flat enough to give the appearance of an octagon when viewed from the first end 48. "Generally planar" does not necessarily mean that the sides 60A-H are flat and uniform along their entire length. Rather, the generally planar sides 60A-H inhibit the stick light 20 from freely rolling along a flat surface 124 (e.g., a tabletop, a work bench, etc.) when the light is resting or laying on the surface 124.

The generally planar sides 60A-H also allow the stick light 20 to be positioned on the flat surface 124 in different orientations to emit light at different angles relative to the surface 124. For example, as shown in FIG. 6, the stick light 20 is positioned on the side 60D to emit light in a generally horizontal direction. That is, a central axis 128 of the light being emitted by the stick light 20 is generally parallel to the surface 124. As shown in FIG. 7, the stick light 20 is positioned on the side 60E to emit light in an oblique direction from the surface 124. In particular, the central axis 128 of the light being emitted by the stick light 20 is oriented at 45 degrees relative to the surface 124. As shown in FIG. 8, the stick light 20 is positioned on the side 60F to emit light in a generally vertical direction. That is, the central axis 128 of the light being emitted by the stick light 20 is generally perpendicular to the surface 124. In each of these positions, the light is being emitted from the front side 60B of the elongated housing 24 and from portions of the two adjacent sides 60A, 60C due to the shape and arrangement of the lens 104 on the faceplate 40. In other embodiments, the elongated housing 24 may have other shapes (e.g., pentagonal, hexagonal, etc.) that allow the stick light 20 to direct light at other angles relative to the flat surface 124.

Figure 9:
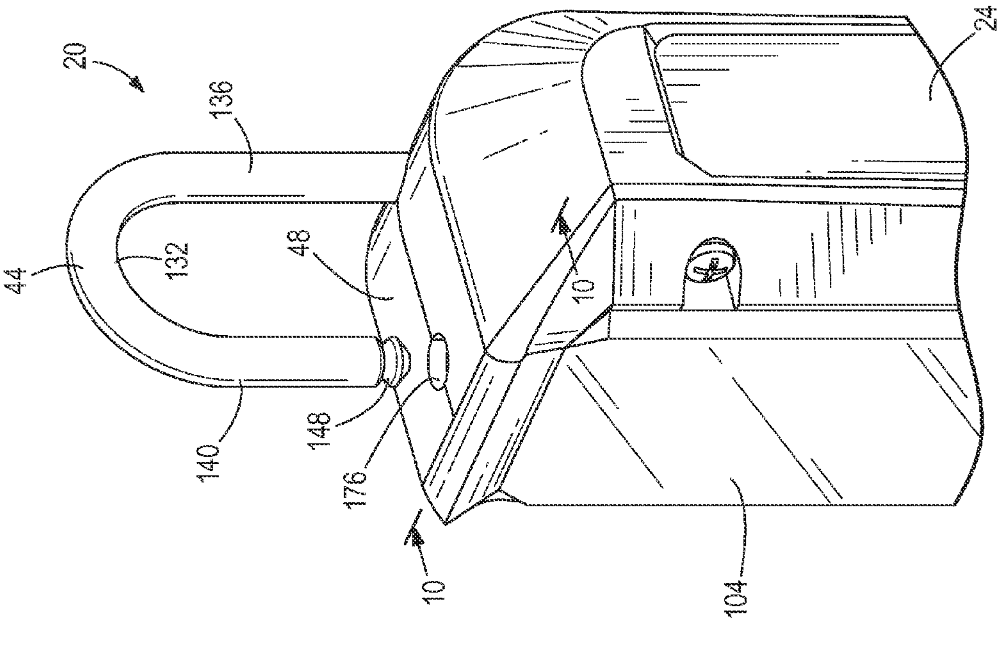
FIG. 9 is an enlarged view of a portion of the stick light of FIG. 1.

Referring to FIGS. 1 and 3, the attachment member 44 extends axially from the first end 48 of the housing 24. The attachment member 44 is used to hang or suspend the stick light 20 from various support structures, including cables, pipes, joists, nails, wall hangers, carabiners, belts, belt loops, shirt pockets, and the like. The illustrated attachment member 44 includes a hook 132 having a first, relatively long arm 136 and a second, relatively short arm 140. The arms 136, 140 are connected together in a J-shape (see FIGS. 11-13). The first arm 136 includes an enlarged boss 144 (FIG. 3) formed at a free end of the arm 136. The second arm 140 includes a groove 148 (FIGS. 9 and 10) formed at a free end of the arm 140. Since the hook 132 includes two arms 136, 140 (and a curved portion connecting the arms 136, 140), statements herein that the attachment member 44 "generally extends" in a certain direction from the elongated housing 24 refer to how the majority of the attachment member 44, viewed as a whole, extends relative to the housing 24.

As shown in FIG. 3, the side 60F of the elongated housing 24 opposite the faceplate 40 defines two slots 152, 156, or tracks, that receive the attachment member 44. The slots 152, 156 are formed in the outer surface of the housing 24 such that the slots 152, 156 are enclosed on three sides, but open through the outer surface. The first slot 152 extends generally parallel to the longitudinal axis 56 from the first end 48 of the elongated housing 24 toward the second end 52, but is spaced apart from the second end 52. The second slot 156 extends generally perpendicular to the longitudinal axis 56 (and thereby the first slot 152) and intersect the first slot 152. A portion of the first slot 152 extends past the second slot 156 and is closer to the second end 52 of the elongated housing 24 than any portion of the second slot 156. The second slot 156 is shorter than the first slot 152 such that the two slots 152, 156 form a t-shape. In the illustrated embodiment, the stick light 20 is designed such that the center of gravity of the light 20 (with the battery pack 28 connected) is located at or near the intersection of the slots 152, 156.

The attachment member 44 is partially received within the slots 152, 156 to movably couple the member 44 to the elongated housing 24. Although the attachment member 44 is shown in FIG. 3 as being received in the first slot 152, the attachment member 44 may alternately be received in the second slot 156 (see FIGS. 16B and 17B). The attachment member 44 is movable relative to the elongated housing 24 by sliding the member 44 within the slots 152, 156. In particular, the attachment member 44 is movable to a number of different positions relative to the housing 24 to use the stick light 20 in different situations. For example, the attachment member 44 is movable between a stowed position (FIGS. 1-3) and different operating positions (FIGS. 11-17B). The enlarged boss 144 (FIG. 3) allows the attachment member 44 to slide within the slots 152, 156 without completely removing the attachment member 44 from the slots 152, 156.

Figure 14B:
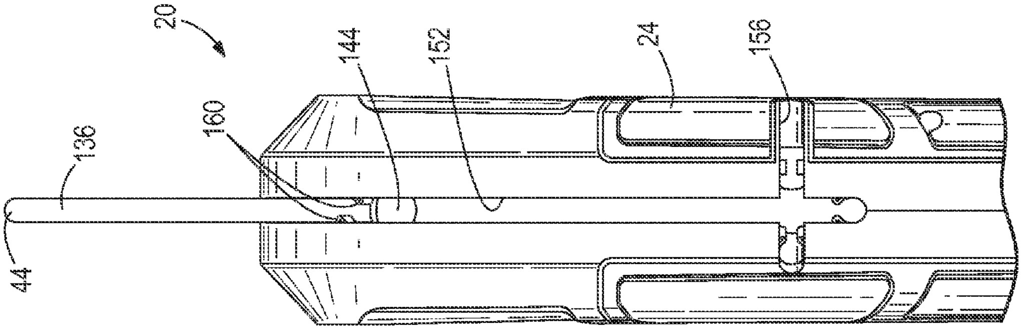
FIGS. 14A and 14B illustrate the stick light of FIG. 1 with the attachment member in a first operating position.
Figure 14A:
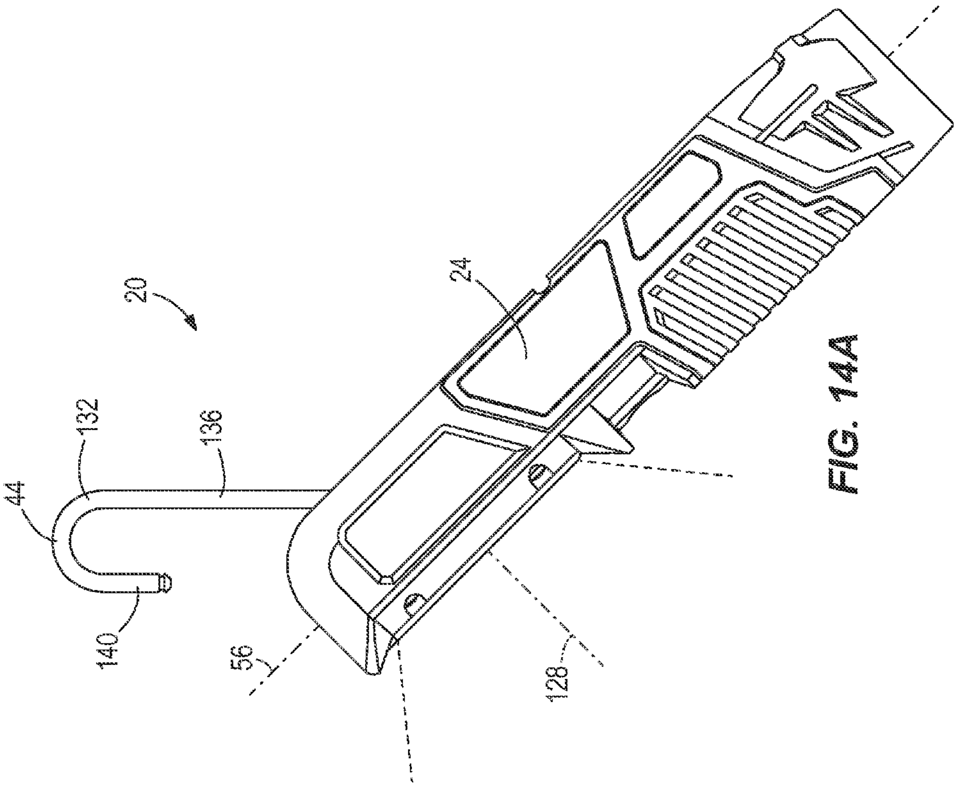
Figure 15B:
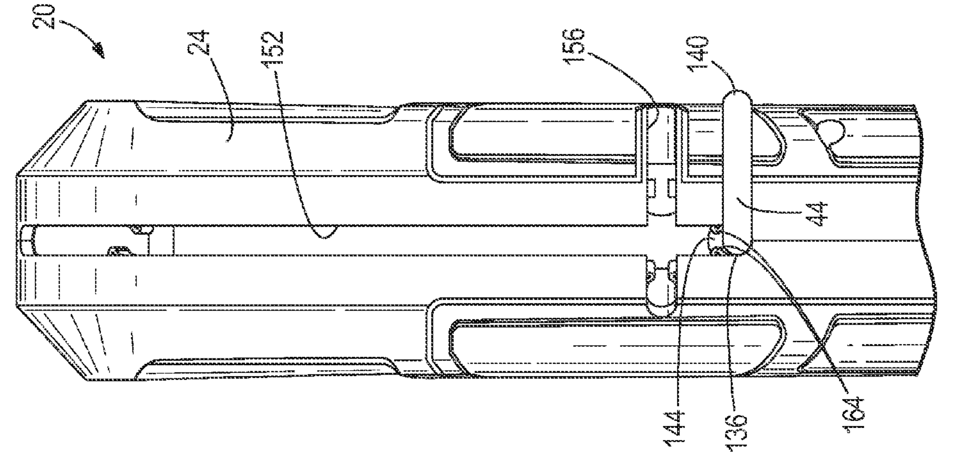
FIGS. 15A and 15B illustrate the stick light of FIG. 1 with the attachment member in a second operating position.
Figure 15A:
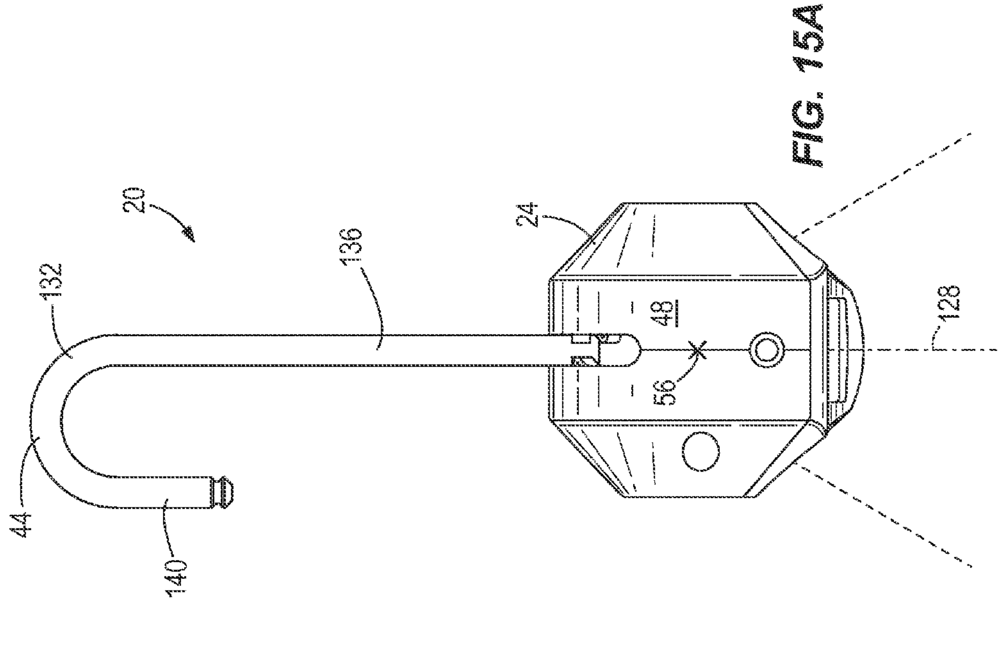
Figure 16B:
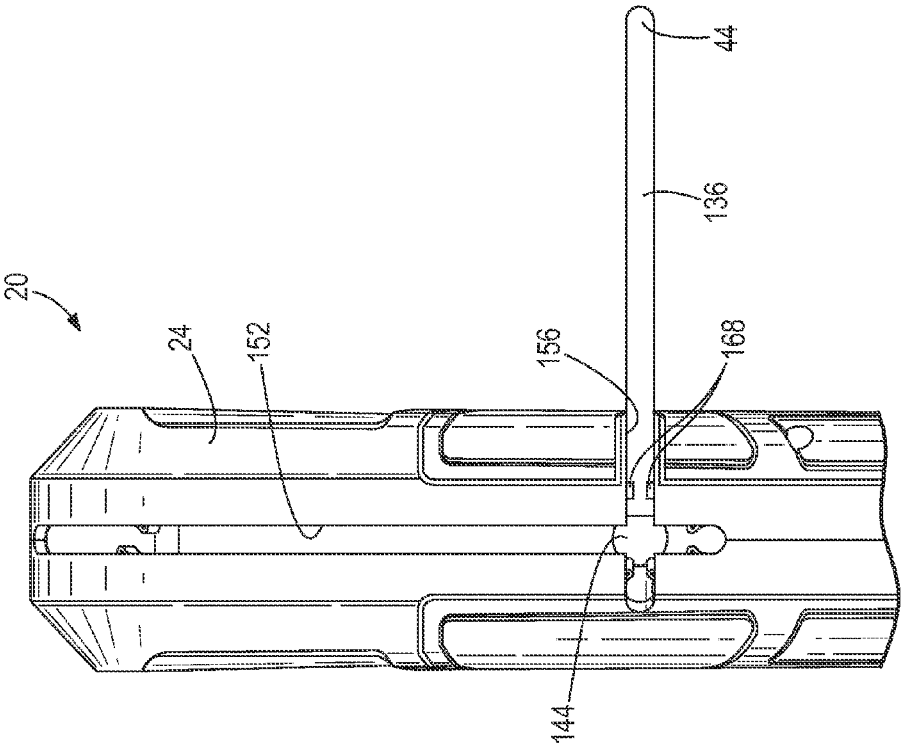
FIGS. 16A and 16B illustrate the stick light of FIG. 1 with the attachment member in a third operating position.
Figure 16A:
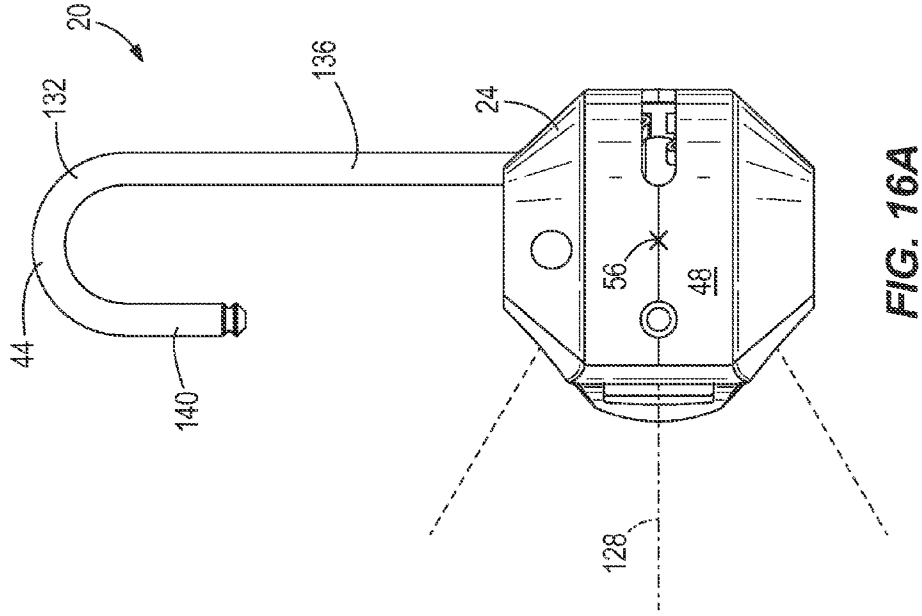
Figure 17B:
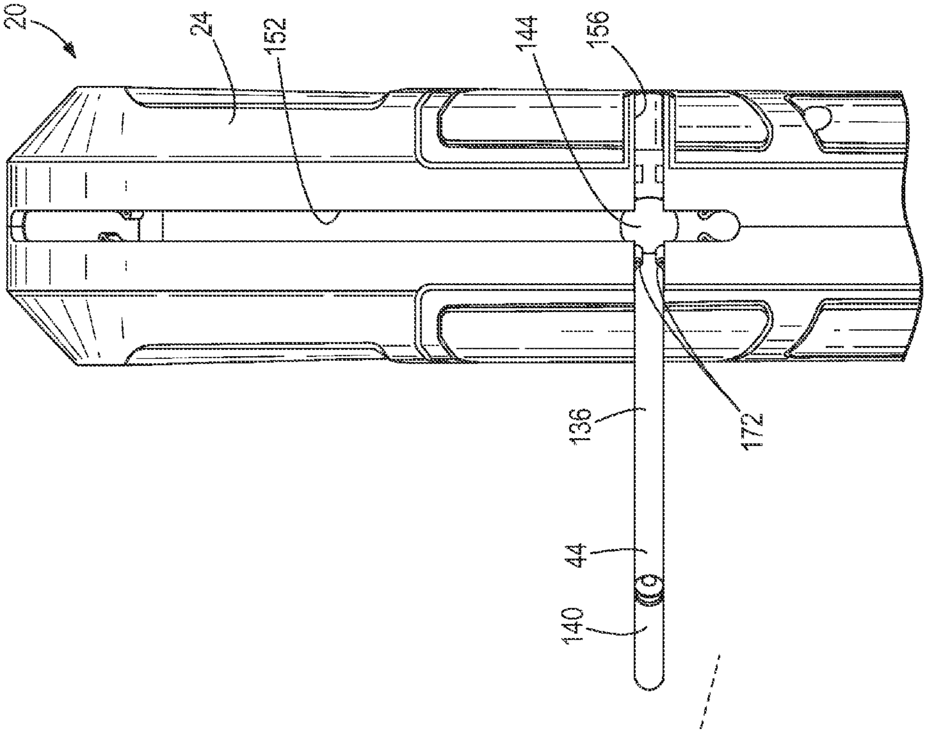
FIGS. 17A and 17B illustrate the stick light of FIG. 1 with the attachment member in a fourth operating position.
Figure 17A:
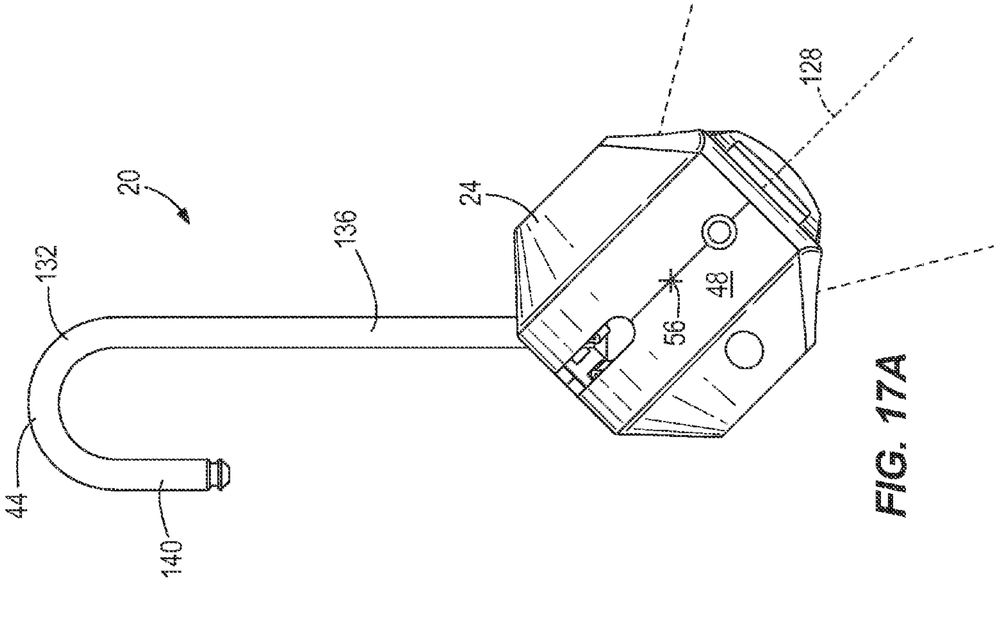

As shown in FIG. 3, the stick light 20 includes four sets of detents 160, 164, 168, 172 to hold the attachment member 44 in the various operating positions relative to the elongated housing 24. The illustrated detents 160, 164, 168, 172 are spring clips that extend into the slots 152, 156 and engage a portion of the first arm 136 of the hook 132. The first set of detents 160 is positioned in the first slot 152 adjacent the first end 48 of the housing 24 to hold the attachment member 44 in a first operating position (FIGS. 14A-B). The first detents 160 are also staggered relative to each other. The second set of detents 164 is positioned in the first slot 152 adjacent a closed end of the slot 152 (i.e., adjacent the end of the slot 152 opposite from the first end 48 of the housing 24). The second set of detents 164 holds the attachment member 44 in a second operating position (FIGS. 15A-B). The third set of detents 168 is positioned in the second slot 156 adjacent an open end of the slot 156. The third set of detents 168 holds the attachment member 44 in a third operating position (FIGS. 16A-B). The fourth set of detents 172 is positioned in the second slot 156 adjacent a closed end of the slot 156. The fourth set of detents 172 holds the attachment member 44 in a fourth operating position (FIGS. 17A-B).

FIGS. 1-3 illustrate the attachment member 44 in the stowed position. In this position, the attachment member 44 generally extends from the first end 48 of the elongated housing 24 in a direction parallel to the longitudinal axis 56. A majority of the first arm 136 of the hook 132 is received in the first slot 152, and a portion of the second arm 140 is received in a hole 176 in the first end 48 of the housing 24 such that only a relatively small portion of the hook 132 extends axially from the first end 48. The first arm 136 and the second arm 140 thereby form a closed loop with the housing 24. In this position, the first arm 136 is positioned in the first slot 152 such that no portion of the hook 132 extends radially outward beyond any of the sides 60A-H of the elongated housing 24. As such, the attachment member 44 does not protrude outwardly beyond the outer surface of the housing 24 and interfere when the stick light 20 is laying on the flat surface 124, as shown in FIGS. 8-11.

Figure 10:
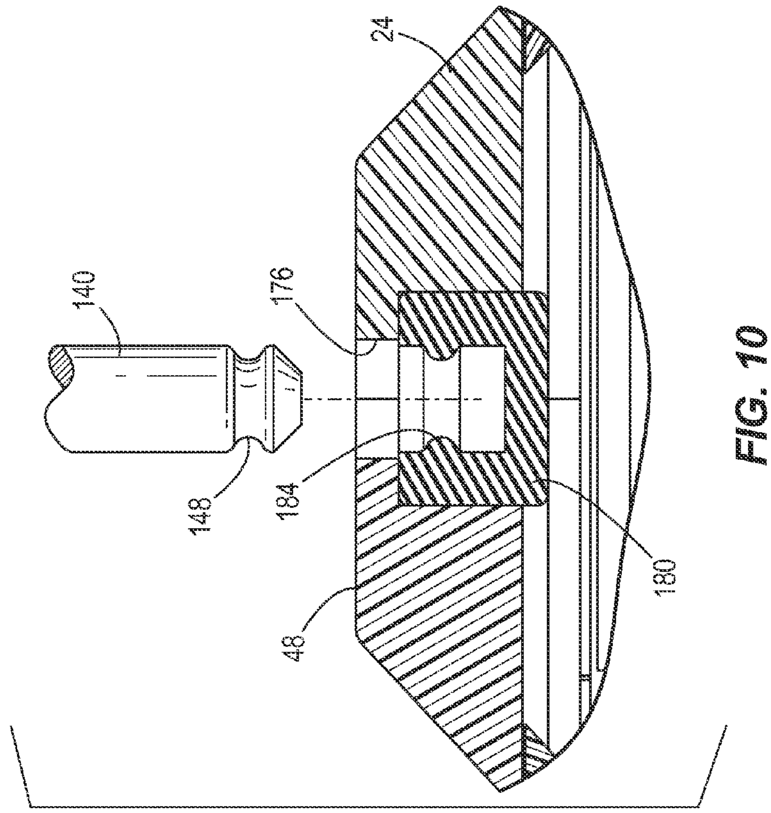
FIG. 10 is a cross-sectional view of a portion of the stick light of FIG. 1.

As shown in FIG. 10, an elastomeric insert 180 is positioned inside the hole 176 formed in the first end 48 of the housing 24. The insert 180 engages the second arm 140 to releasably hold the attachment member 44 in the stowed position. The illustrated insert 180 includes an annular projection 184 that extends radially inward. The annular projection 184 engages and fits within the annular groove 148 in the second arm 140 to hold the arm 140 in the hole 176. This engagement can be overcome by pulling the attachment member 44 in a direction parallel to the longitudinal axis 56 (e.g., in the direction of arrow A in FIG. 11). In other embodiments, the second arm 140 may include the projection 184, and the insert 180 may define the groove 148.

Figure 12:
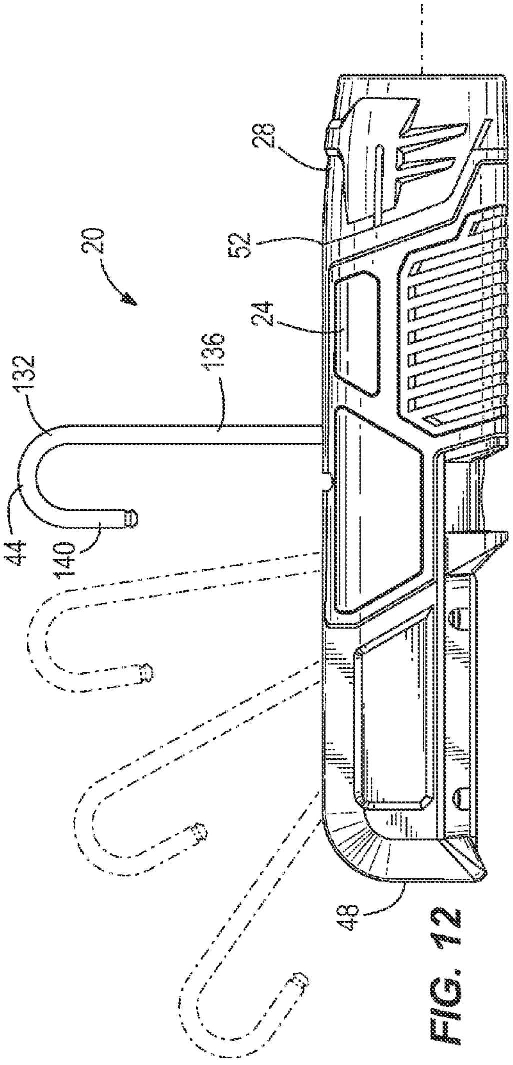
FIG. 12 is a side view of the stick light of FIG. 1 with the attachment member pivoting to an operating position.
Figure 13:
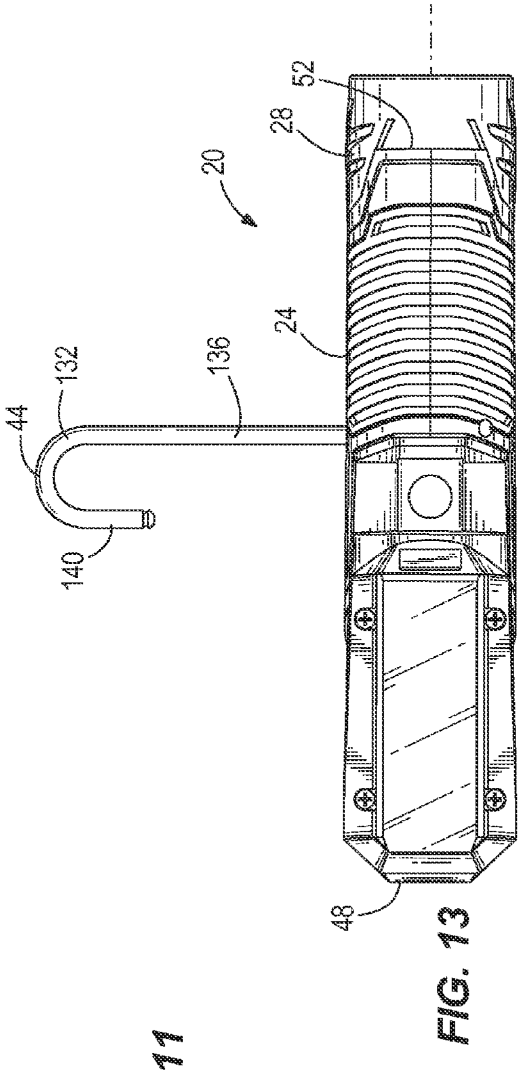
FIG. 13 is a front view of the stick light of FIG. 1 with the attachment member in another operating position.
Figure 11:
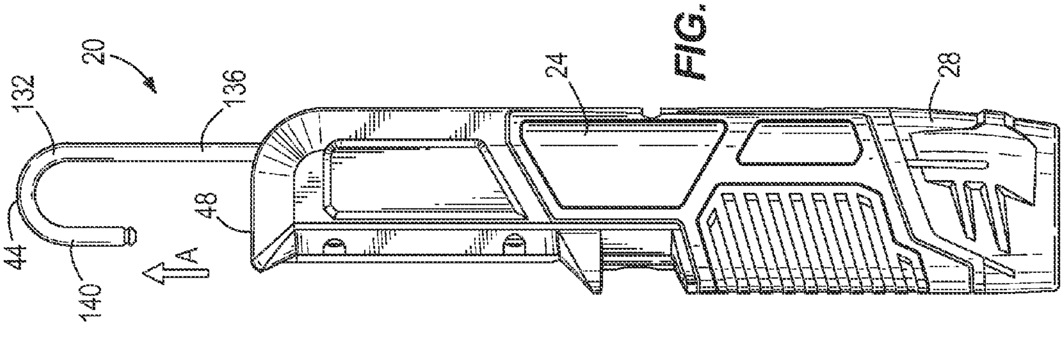
FIG. 11 is a side view of the stick light of FIG. 1 including an attachment member in an extended position.

Pulling the attachment member 44 axially (e.g., in the direction of arrow A) moves the attachment member 44 from the stowed position to an extended operating position, as shown in FIG. 11. From the extended operating position, the attachment member 44 can then be moved to any of the other operating positions. As shown in FIG. 12, the attachment member 44 can be pivoted within the first slot 152 toward the second end 52 of the elongated housing 24. When pivoted fully upright, the attachment member 44 generally extends from the elongated housing 24 in a direction perpendicular to the longitudinal axis 56. Furthermore, as shown in FIG. 13, the attachment member 44 can be moved from the first slot 152 to the second slot 156. When in the second slot 156, the attachment member 44 again generally extends from the elongated housing 24 in a direction perpendicular to the longitudinal axis 56. In either of the operating positions shown in FIGS. 12 and 13, the attachment member 44 can also be rotated relative to the elongated housing 24 such that the second arm 140 of the hook 132 is moved into different positions relative to the housing 24.

FIGS. 14A-17B illustrate four different operating positions of the attachment member 44. In other embodiments, the stick light 20 (particularly the slots 152, 156 and the detents 160, 164, 168, 172) may be designed so that the attachment member 44 can be positioned in fewer or more operating positions relative to the elongated housing 24.

In the first operating position (FIGS. 14A-B), a portion of the first arm 136 of the hook 132 is received in the first slot 152 and engaged by the first set of detents 160. In this position, the attachment member 44 generally extends from the elongated housing 24 in a direction that is obliquely angled relative to the longitudinal axis 56. When hanging from a support structure by the attachment member 44, the longitudinal axis 56 of the housing 24 is likewise obliquely angled relative to the direction of gravity, and the central axis 128 of the light being emitted by the light source 32 is also obliquely angled relative to the direction of gravity. In the illustrated embodiment, the central axis 32 of the light being emitted is angled approximately 135 degrees relative to the first arm 136 of the hook 132. The staggered detents 160 help maintain the stick light 20 in this tilted orientation without swinging.

In the second operating position (FIGS. 15A-B), a portion of the first arm 136 of the hook 132 is received in the first slot 152 and engaged by the second set of detents 164. In this position, the attachment member 44 generally extends from the elongated housing 24 in a direction that is perpendicular to the longitudinal axis 56. When hanging from a support structure by the attachment member 44, the longitudinal axis 56 of the housing 24 is perpendicular relative to the direction of gravity (i.e., the stick light 20 is horizontal relative to the ground), and the central axis 128 of the light being emitted by the light source is parallel relative to the direction of gravity (i.e., the light is emitted toward the ground). More particularly, the central axis 128 of the light being emitted is angled approximately 180 degrees relative to the first arm 136 of the hook 132.

In the third operating position (FIGS. 16A-B), a portion of the first arm 136 of the hook 132 is received in the second slot 156 and engaged by the third set of detents 168. In this position, the attachment member 44 generally extends from the elongated housing 24 in a direction that is perpendicular to the longitudinal axis 56. When hanging from a support structure by the attachment member 44, the longitudinal axis 56 of the housing 24 is perpendicular relative to the direction of gravity (i.e., the stick light 20 is horizontal relative to the ground), and the central axis 128 of the light being emitted by the light source 32 is perpendicular to the direction of gravity (i.e., the light is emitted horizontally or parallel to the ground). More particularly, the central axis 128 of the light being emitted is angled approximately 90 degrees relative to the first arm 136 of the hook 132.

In the fourth operating position (FIGS. 17A-B), a portion of the first arm 136 of the hook 132 is received in the second slot 156 and engaged by the fourth set of detents 172. In this position, the attachment member 44 generally extends from the elongated housing 24 in a direction that is obliquely angled relative to the longitudinal axis 56. When hanging from a support structure by the attachment member 44, the longitudinal axis 56 of the housing 24 is perpendicular to the direction of gravity (i.e., the stick light 20 is horizontal relative to the ground), and the central axis 128 of the light being emitted by the light source 32 is obliquely angled relative to the direction of gravity. In the illustrated embodiment, the central axis 128 of the light being emitted is angled approximately 135 degrees relative to the first arm 136 of the hook 132.

Figure 19:
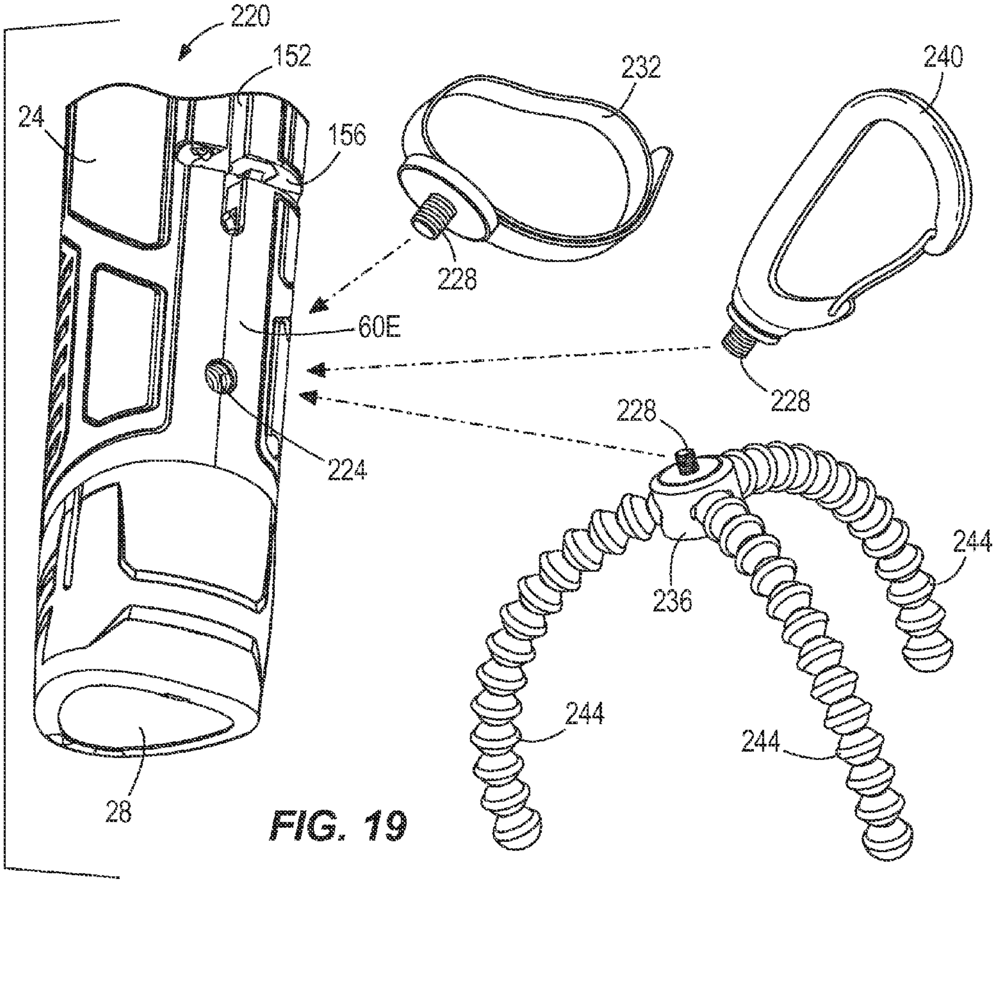
FIG. 19 illustrates another stick light and three accessories that are attachable to the stick light.

FIG. 19 illustrates another portable light 220, such as a stick light. The illustrated stick light 220 is similar to the stick light 20 described above, and like parts have been given the same reference numbers. In the illustrated embodiment, the stick light 220 also includes an accessory aperture 224 formed in the side 60E of the elongated housing 24 adjacent the slots 152, 156. Although the illustrated accessory aperture 224 is formed in the side 60E of the housing 24 opposite from the faceplate 40, in other embodiments, the accessory aperture 224 may be formed elsewhere on the stick light 220.

The accessory aperture 224 is a threaded opening that is configured to receive a fastener 228. The fastener 228 is used to attach an accessory to the light to increase the functionality of the light. For example, as shown in FIG. 19, a strap 232, a stand 236, or a clip 240 could all be connected to the stick light 220 using the accessory aperture 224 and the corresponding fastener 228. The illustrated strap 232 is an arm strap that includes hook-and-loop fasteners (e.g., VELCRO) to wrap in a loop around a user. The illustrated stand 236 includes three articulatable legs 244 that can be used to support and position the light 220 on a desired surface. The illustrated clip 240 may be connected to another object or structure as an alternative way to hold or hang the stick light 220. Although only three accessories 232, 236, 240 are illustrated, the stick light 220 is usable with many other types of accessories that can be connected to the aperture 224 via a suitable fastener.

Thus, the invention provides a portable light that is easily supported in multiple orientations on a flat surface or when hanging from a support structure to illuminate a work area or region. The light uses a power tool battery pack to power LEDs to provide the desired illumination.

Various features and advantages of the invention are set forth in the following claims.

The invention claimed is:

1. A portable light comprising:

an elongated housing having a longitudinal axis and defining a slot;

a light source positioned within the elongated housing;

an attachment member movably coupled to the elongated housing to hang the portable light from a support structure, a portion of the attachment member being received in the slot, the attachment member movable to a first position, in which the attachment member generally extends from the elongated housing in a direction parallel to the longitudinal axis, to a second position, in which the attachment member generally extends from the elongated housing in a direction perpendicular to the longitudinal axis, and a third position, in which the attachment member extends from the elongated housing in a direction that is obliquely angled relative to the longitudinal axis;

a first detent positioned in the slot, the first detent engaging the attachment member to releasably hold the attachment member in the second position; and a second detent positioned in the slot and spaced apart from the first detent, the second detent engaging the attachment member to releasably hold the attachment member in the third position.

2. The portable light of claim 1, wherein the attachment member is further movable to a fourth position, in which the attachment member generally extends from the elongated housing in another direction that is perpendicular to the longitudinal axis, and wherein the fourth position is different from the second position.

3. The portable light of claim 1, wherein the attachment member includes a hook having a first arm and a second arm, wherein the first and second arms are generally parallel, and wherein the first arm is longer than the second arm.

4. The portable light of claim 3, wherein the first arm is generally parallel to the longitudinal axis when the attachment member is in the first position, and wherein the first arm is generally perpendicular to the longitudinal axis when the attachment member is in the second position.

5. The portable light of claim 3, wherein the first arm and the second arm of the hook form a closed loop with the elongated housing when the attachment member is in the first position.

6. The portable light of claim 5, wherein the elongated housing defines a hole, and wherein a portion of the second arm is received in the hole when the attachment member is in the first position.

7. The portable light of claim 6, wherein the elongated housing includes a first end and a second end, wherein the longitudinal axis extends through the first and second ends, and wherein the hole is formed in the first end.

8. The portable light of claim 5, wherein one of the elongated housing and the second arm includes a projection, wherein the other of the elongated housing the second arm defines a groove, and wherein the projection engages the groove to releasably hold the attachment member in the first position.

9. The portable light of claim 1, further comprising a battery pack removably coupled to the elongated housing to power the light source.

10. The portable light of claim 9, wherein the elongated housing has a first end and a second end, wherein the longitudinal axis extends through the first and second ends, wherein the light source is positioned adjacent the first end, and wherein the battery pack is coupled to the second end.

11. The portable light of claim 1, wherein the light source includes a plurality of light emitting diodes.

12. A portable light comprising:

an elongated housing having a longitudinal axis;

a light source positioned within the elongated housing; and an attachment member movably coupled to the elongated housing to hang the portable light from a support structure, the attachment member movable to a first position, in which the attachment member generally extends from the elongated housing in a direction parallel to the longitudinal axis, and to a second position, in which the attachment member generally extends from the elongated housing in a direction perpendicular to the longitudinal axis;

wherein the elongated housing defines a slot extending generally parallel to the longitudinal axis, and wherein a portion of the attachment member is received in the slot; and wherein the slot is a first slot, wherein the elongated housing defines a second slot intersecting the first slot and extending generally perpendicular to the longitudinal axis, wherein the portion of the attachment member is received in the first slot when the attachment member is in the first and second positions, and wherein the attachment member is further movable to a third position, in which the portion of the attachment member is received in the second slot.

13. The portable light of claim 12, further comprising a detent positioned in the first slot, wherein the detent engages the attachment member to releasably hold the attachment member in the second position.

14. The portable light of claim 12, wherein, when in the third position, the attachment member generally extends from the elongated housing in another direction that is perpendicular to the longitudinal axis.

15. The portable light of claim 12, wherein the attachment member includes a hook having a first arm and a second arm, wherein the first and second arms are generally parallel, and wherein the first arm is longer than the second arm.

16. The portable light of claim 15, wherein the first arm is generally parallel to the longitudinal axis when the attachment member is in the first position, and wherein the first arm is generally perpendicular to the longitudinal axis when the attachment member is in the second position.

17. The portable light of claim 15, wherein the first arm and the second arm of the hook form a closed loop with the elongated housing when the attachment member is in the first position.

18. The portable light of claim 17, wherein the elongated housing defines a hole, and wherein a portion of the second arm is received in the hole when the attachment member is in the first position.

19. The portable light of claim 18, wherein the elongated housing includes a first end and a second end, wherein the longitudinal axis extends through the first and second ends, and wherein the hole is formed in the first end.

20. The portable light of claim 17, wherein one of the elongated housing and the second arm includes a projection, wherein the other of the elongated housing the second arm defines a groove, and wherein the projection engages the groove to releasably hold the attachment member in the first position.

21. The portable light of claim 12, further comprising a battery pack removably coupled to the elongated housing to power the light source.

22. The portable light of claim 21, wherein the elongated housing has a first end and a second end, wherein the longitudinal axis extends through the first and second ends, wherein the light source is positioned adjacent the first end, and wherein the battery pack is coupled to the second end.

23. The portable light of claim 12, wherein the light source includes a plurality of light emitting diodes.

24. A portable light comprising: an elongated housing having a first end, a second end, and a first side extending between the first and second ends, and a second side extending between the first and second ends, the second side defining a first slot and a second slot; a light source positioned within the elongated housing, the light source being visible through the first side of the elongated housing; and an attachment member coupled to the elongated housing to hang the portable light from a support structure, the attachment member partially and alternately received within the first slot and the second slot such that the attachment member is movable relative to the elongated housing, wherein the attachment member is movable relative to the elongated housing within the first and second slots without completely removing the attachment member from the first and second slots, wherein the attachment member includes an enlarged boss, and wherein the enlarged boss is slidable within the first and second slots.

25. The portable light of claim 24, wherein the elongated housing has a longitudinal axis extending through the first and second ends, and wherein the first slot extends generally parallel to the longitudinal axis.

26. The portable light of claim 24, wherein the first slot extends from the first end of the elongated housing toward the second end of the elongated housing.

27. The portable light of claim 26, wherein the first slot is spaced apart from the second end of the elongated housing.

28. The portable light of claim 24, wherein the attachment member includes a hook having a first arm and a second arm, wherein the first and second arms are generally parallel, and wherein the first arm is longer than the second arm.

29. The portable light of claim 28, wherein a portion of the first arm is alternately received within the first slot and the second slot.

30. The portable light of claim 24, further comprising a detent positioned within one of the first and second slots, wherein the detent engages the attachment member to releasably hold the attachment member within the one of the first and second slots.

31. The portable light of claim 24, wherein the second slot intersects the first slot.

32. The portable light of claim 31, wherein the second slot extends generally perpendicular to the first slot.

33. The portable light of claim 24, further comprising a battery pack removably coupled to the second end of the elongated housing to power the light source.

* * * * *